United States Patent

Tran

[11] Patent Number: 5,123,470
[45] Date of Patent: Jun. 23, 1992

[54] TIRE REMOVAL TOOL

[76] Inventor: Loi V. Tran, 1028 Jackson St., Easton, Pa. 18042

[21] Appl. No.: 617,552

[22] Filed: Nov. 26, 1990

[51] Int. Cl.$^5$ .............................................. B60C 25/02
[52] U.S. Cl. ................................... 157/1.3; 254/50.1; 254/131
[58] Field of Search ............... 157/1.3, 1.17, 1.1; 254/131, 131.5, 50.1, 27

[56] References Cited

U.S. PATENT DOCUMENTS

| | | | |
|---|---|---|---|
| 834,908 | 11/1906 | Hussey | 157/1.3 X |
| 934,461 | 9/1909 | Phillips | 157/1.3 X |
| 2,188,211 | 8/1937 | Tilson | 157/6 |
| 2,294,271 | 9/1941 | Bethard | 157/6 |
| 2,399,146 | 10/1943 | Schumann | 157/6 |
| 2,565,216 | 8/1946 | Gox | 157/1.17 |
| 2,712,350 | 7/1955 | Henderson | 157/1.3 X |
| 4,436,134 | 5/1984 | Gaither | 157/1.3 |
| 4,527,607 | 7/1985 | Gaither | 157/1.3 |
| 4,919,184 | 4/1990 | duQuesne | 157/1.3 |

Primary Examiner—D. S. Meislin
Attorney, Agent, or Firm—Eckert Seamans Cherin & Mellott

[57] ABSTRACT

A tool for removing a tire from a wheel rim includes an elongated body member with a handle at one end and a tool head at the other end. The tool head includes a tire engaging member terminating in at least two laterally spaced apart tire contact parts, and a rigid, L-shaped wheel rim engaging member terminating in a wheel rim contact part. The wheel rim contact part is sufficiently spaced from the tire engaging member to accept a wheel rim flange therebetween. In a preferred embodiment, each of the at least two tire contact parts and the wheel rim contact part has a rotatable roller.

20 Claims, 4 Drawing Sheets

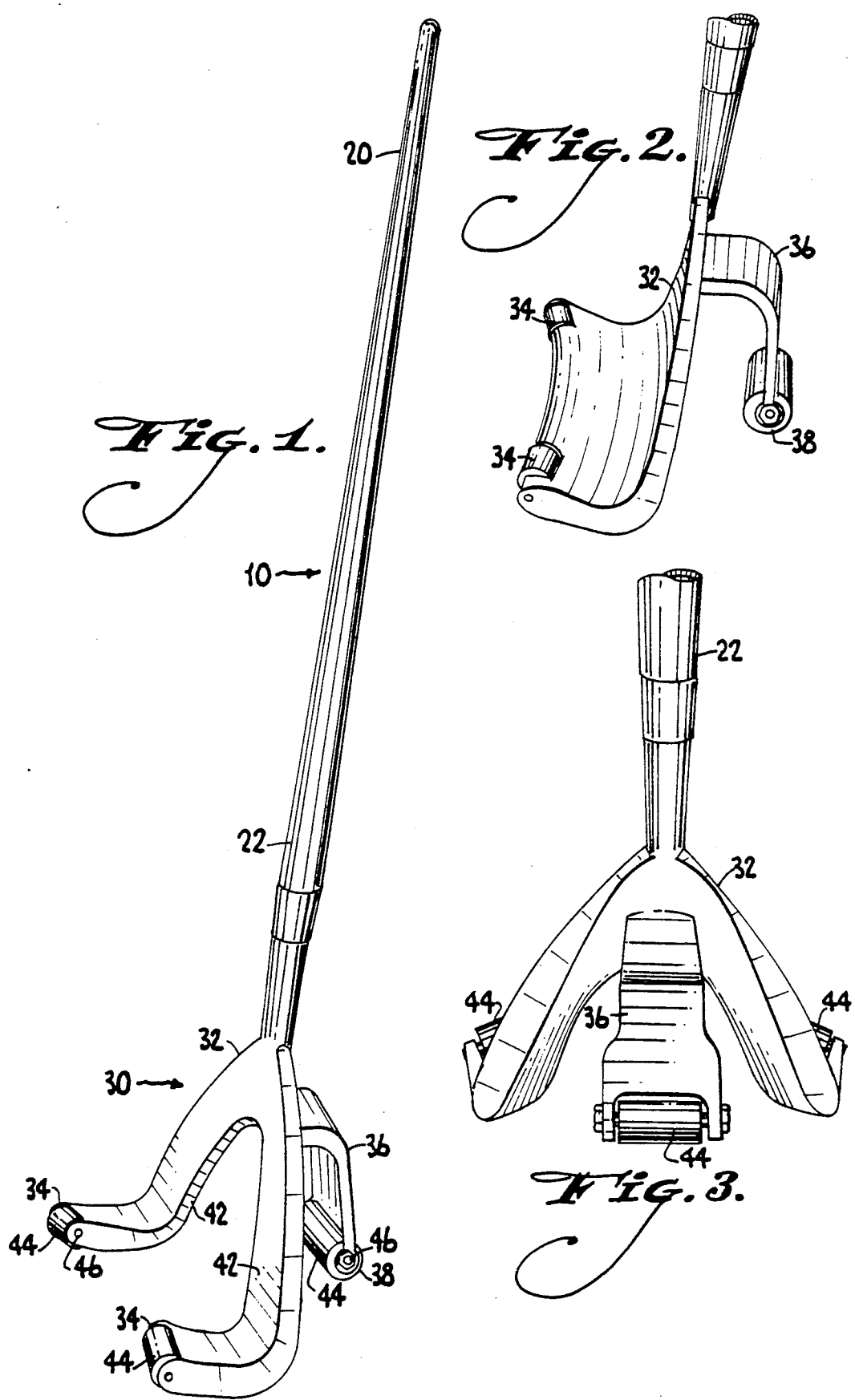

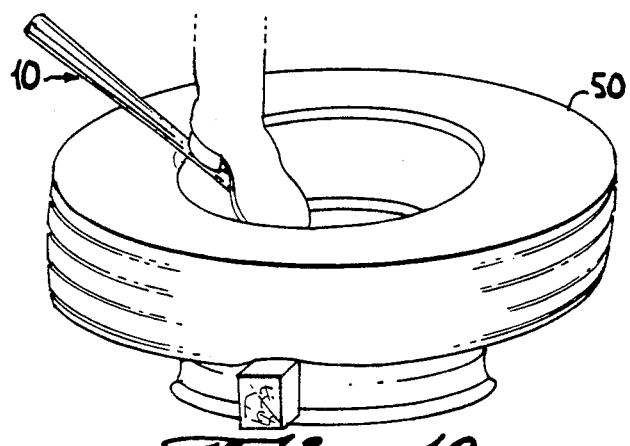
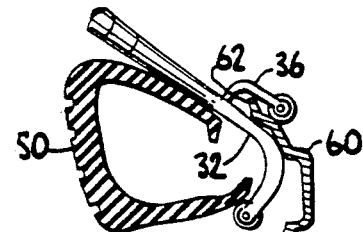
Fig. 10.  Fig. 10a.
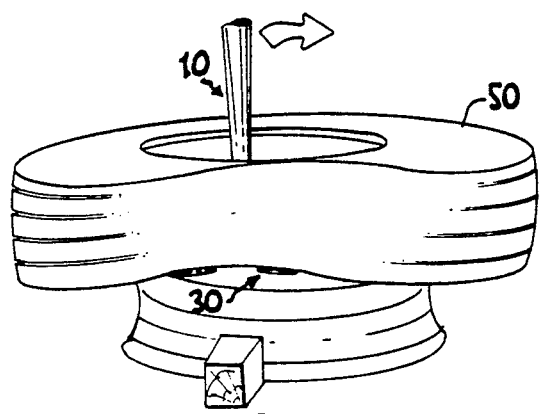
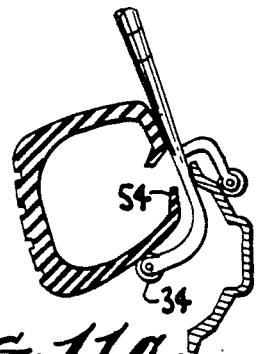
Fig. 11.  Fig. 11a.
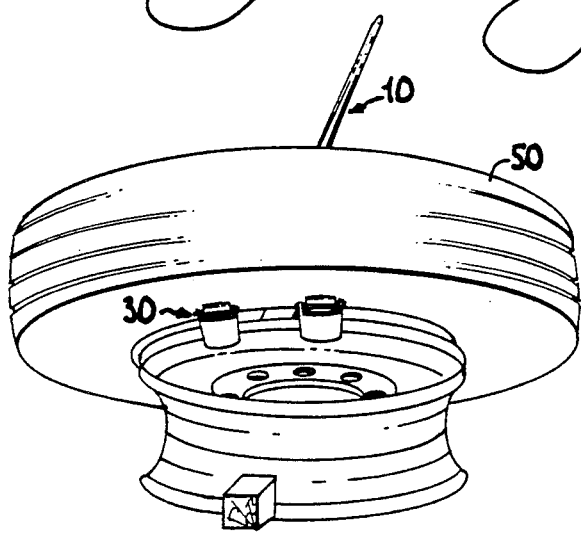
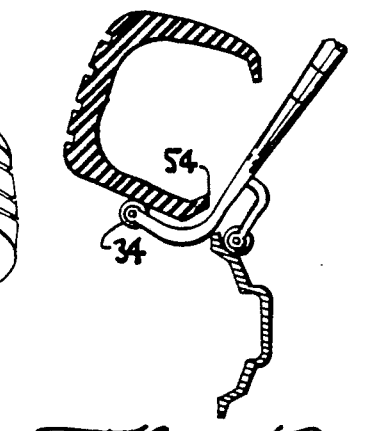
Fig. 12.  Fig. 12a.

TIRE REMOVAL TOOL

BACKGROUND OF THE INVENTION

1. Field of the Invention

The invention relates to the field of tools for removing a vehicle tire from a wheel rim, and in particular to a manual pry tool for reaching and pulling free both beads of a truck tire from one side of the rim.

2. Prior Art

Various tools for removing a tire from a wheel rim are known. Such tools generally comprise an elongated pry bar which has a handle end to be gripped by a user, and a flattened tool end for insertion between one bead of the tire and the wheel rim. The beads of the tire normally reside between flanges of the wheel rim and the beads must be moved axially outwardly over the rim flange to remove the tire from the rim. After the tool end is inserted between the tire and the wheel rim, the user applies pressure to the handle end, using the tool as a lever with the wheel rim as a fulcrum, in order to pry a short length of the tire bead (which is of slightly smaller circumference than the wheel rim but can be resiliently stretched) beyond the flange of the wheel rim. The process is repeated in successive stages, often by using two or three pry tools around the periphery of the wheel rim until the tire bead is more than halfway passed over the rim, whereupon the resilience of the bead assists in drawing the remainder of the bead to the outside, and the bead can be completely passed over the wheel rim flange. Alternatively, after a length of the tire bead has been pried beyond the rim flange, a machine may be utilized for sliding the tool end circumferentially around the periphery of the wheel rim flange whereby the tire bead is pulled over the rim flange in a continuous motion. In either case, the tool end of the removal device may also have one or more appendages for contacting the wheel rim or tire in a beneficial manner during the removal operation.

In U.S. Pat. No. 2,188,211 to Tilson there is disclosed a simple removal tool wherein the tool end is a flattened bar which is suitably curved to conform to the inside of a wheel rim flange. A user inserts the tool end between the tire and the rim flange, and applies pressure on a handle end of the tool in order to pull a portion of the tire bead over the rim flange. The bead is pulled radially outwardly of the rim as well as axially over the rim flange, in a prying motion. The user must hold the starting portion and lift successive portions of the tire bead beyond the rim flange in sequence proceeding around the periphery of the wheel rim in order to pass the entire bead over the flange. This is done for each bead to remove the tire from the rim.

U.S. Pat. No. 2,294,271 — Bethard and U.S. Pat. No. 2,399,146 — Schumann disclose tools for loosening a tire bead from a wheel rim. The tools include a projecting portion for insertion between the tire and the rim flange. The tools are intended for loosening large size truck or tractor tires which not only are difficult due to their size, but also may be stuck to the rim because of rust or dirt. Neither Bethard nor Schumann teach a tool for passing a tire bead over a rim flange. Similarly, U.S. Pat. No. 2,565,216 — Fox discloses a tool for loosening a tire from a wheel rim, but Fox does not disclose any tool or method for lifting the tire bead over the rim flange.

U.S. Pat. No. 4,919,184 — du Quesne discloses a tool for removing a tire of the type wherein the tire bead is mounted over the outside of the rim flange. The tool is not useful for removing a conventional tire wherein the tire bead is mounted inside of and between the two opposite flanges of a wheel rim.

U.S. Pat. No. 4,527,607 — Gaither discloses a tire removal tool having an arcuate flange insertable between a tire bead and wheel rim, and a plurality of roller members at the outer end of the arcuate flange for engaging the inner wall of the tire. The tool further has an arm member with a second plurality of rollers at its end for engaging the wheel rim. The arm member extends at a planar angle with respect to the body of the tool. Gaither discloses using the tool to remove an upper tire bead from the wheel rim when the tire is disposed horizontally on the ground. This is accomplished by inserting a separate bar into the tool for providing leverage, and pulling back on the bar to use the rim flange as a fulcrum. Due to the substantial width of the arcuate flange, it is possible to pull the bead over the rim in one lever motion rather than to lift successive segments while advancing the tool circumferentially around the rim. Gaither does not disclose using such a tool to remove a lower tire bead from the wheel rim. The tool as taught by Gaither cannot be effectively used to remove the lower tire bead because the arm member, which extends at a planar angle with respect to the body of the tool, interferes with the wheel rim and limits the depth to which the outer end of the arcuate flange can be inserted between the tire and the wheel rim in an effort to engage the lower bead. Gather teaches a different form of tool for the lower bead which requires that the user force a short plate through a gap between both beads and the rim, which plate can receive the separate bar for forcing the tire fully over the rim flange.

There is a need for a tire removal tool which permits the removal of both the lower and the upper tire beads from the wheel rim in successive operations, in a manner that allows single lever motions to pull free the first bead and the second bead in sequence.

SUMMARY OF THE INVENTION

It is an object of the invention to provide a tire removal tool which is durable, simple and easy to use for various tire sizes.

It is another object of the invention to provide a tire removal tool which allows an upper tire bead to be lifted beyond its wheel rim flange in one lever-like operation.

It is a further object of the invention to provide a tire removal tool which also allows the lower tire bead to be lifted beyond an upper wheel rim flange, in a similar lever-like operation while the wheel rim is resting on the ground.

These and other objects are accomplished by a tool comprising an elongated body member, and a tool head attached at one end of the elongated body member. The tool head has at least two laterally spaced apart legs extending from the elongated body member and terminating in tire contact parts, and a rigid L-shaped arm member extending from the elongated body member and terminating in a wheel rim contact part, said wheel rim contact part being sufficiently spaced from the at least two legs to accept a flange of a wheel rim therebetween, allowing the arm member to be manipulated to engage a tire bead on an opposite side of the wheel from a side of application of the tool. The legs are spaced sufficiently to pull the bead past the rim in one lever-like motion. The wheel rim and tire contact parts preferably comprise rotatable rollers for decreasing sliding friction at the contact parts.

BRIEF DESCRIPTION OF THE DRAWINGS

There are shown in the drawings the embodiments of the invention that are presently preferred. It should be understood, however, that the invention is not limited to the precise arrangements and instrumentalities shown in the drawings, wherein:

FIG. 1 is a perspective view of a tire removal tool having spaced apart legs according to the invention.

FIG. 2 is a side view of a tool head of the tire removal tool having an integal body according to the invention.

FIG. 3 is a rear view of the tool head of the tire removal tool.

FIG. 10 is a view of the tire removal tool being inserted to engage the lower tire bead.

FIG. 10a is a cross-sectional view of the tire and tire removal tool shown in FIG. 10.

FIG. 11 is a view of the lower tire bead being lifted over the upper wheel rim flange.

FIG. 11a is a cross-sectional view of the tire and tire removal tool shown in FIG. 11.

FIG. 12 is a view of the tire being wholly removed from the wheel rim.

FIG. 12a is a cross-sectional view of the tire and tire removal tool shown in FIG. 12.

DETAILED DESCRIPTION OF THE PREFERRED EMBODIMENTS

Figure 4:
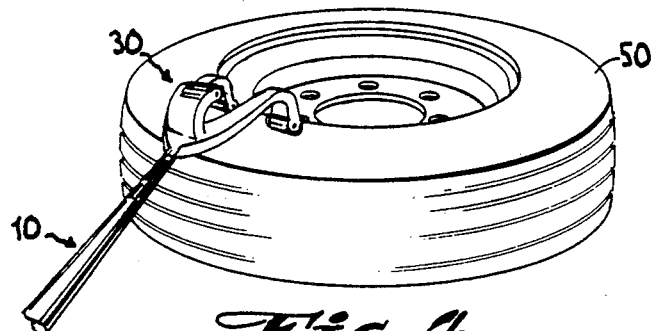
FIG. 4 is a top perspective view of the tire removal tool positioned for initial insertion between a tire and a wheel rim.
Figure 4A:
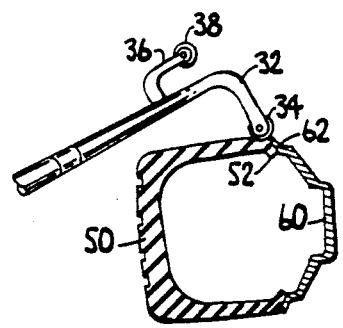
FIG. 4a is a cross-sectional view through a section of the tire, showing the relative positions of the tire beads and tire removal tool as shown in FIG. 4.

A tire removal tool according to the invention as shown in FIGS. 1-3 comprises an elongated body member 10 with a handle end 20 and a tool end 22. A tool head 30 is attached to, or is integral with, the tool end 22. The handle end 20 is preferably defined by a shaft extending to the extreme end of the tire removal tool, although an additional suitable handgrip part, for example a tubular grip or closed end U-shaped member or the like, may be attached to the handle end. The elongated body member 10 is sufficiently long so that a user of the tire removal tool can develop adequate leverage to pass the tire beads over the rim of a tire by using the elongated body member as a lever arm as hereinafter described, without having to apply excessive force at the handle end. The elongated body member 20 and the tool head 30 are preferably made from a corrosion resistant steel for adequate strength and durability.

The conventional pneumatic tire for motor vehicles and the like has a bead along the radial inner edge of the tire, which engages with axial pressure, due to tire inflation, against the radially outermost lip of the wheel rim flange on both opposite sides of the wheel. The bead and the rim flange in each case are continuous circles, and the bead is slightly smaller in diameter than the rim flange. The bead normally has an embedded wire reinforcement, but is sufficiently resilient that with sufficient force the bead can be stretched in circumference to be forced over the rim flange.

The tool head 30 which accomplishes this includes a tire engaging member 32 extending from the elongated body member 10 and terminating in at least two laterally spaced apart tire contact parts 34, and a rigid, L-shaped wheel rim engaging member 36 extending from the tire engaging member 32 and terminating in a wheel rim contact part 38. The wheel rim contact part 38 is sufficiently spaced from the tire engaging member 32 that a wheel rim flange will fit between the tire contact parts 34 and the rim contact part 38, as shown in FIGS. 6a, 10a and 11a. In this manner the tool is arranged to permit the respective contact parts to reach under and engage the tire bead for removing the tire bead over the rim flange.

The tire engaging member 32 preferably defines at least two laterally spaced apart legs 42 each having one of the at least two laterally spaced apart tire contact parts 34 at the end thereof. The at least two legs 42 may diverge as they extend from the elongated body member 10. Alternatively, the tire contact parts 34 may be on an integral body having, for example, an inverted T-shape or a triangular shape, as shown in FIG. 2. The tire contact parts are arranged arcuately to correspond to the shape of the wheel rim. In addition, the legs and the wheel rim engaging member 36 each define a substantially right angled bend. The legs protrude at a right angle from a plane of the elongated body member 10, the right angle being located at a distance from the point of junction with the wheel rim engaging member 36. The wheel rim engaging member protrudes from the plane at a right angle to a right angle bend leading to the rim contact part 38.

Preferably, each of the wheel rim contact part 38 and the at least two tire contact parts 34 comprises at least one rotatable roller 44 at a respective distal end thereof, for decreasing sliding friction at the contact parts and minimizing potential damage to the rim and/or tire. It is preferred that the at least one rotatable roller be a single cylindrically shaped member having an axle 46 such as a pin or the like which is retained in the wheel rim engaging member and the tire engaging member by an interference fit. The at least one rotatable roller may also have a conical or spherical shape, and may include more than one roller, such as two or more spherical members, etc.

Each of the at least one rotatable rollers may have a rotation axis which is not parallel with the rotation axis of any other at least one rotatable roller. It is preferred that the at least two tire contact parts be disposed substantially along tangents to an arc of a tire bead when the wheel rim flange is between the wheel rim contact part and the tire engaging member.

Figure 5:
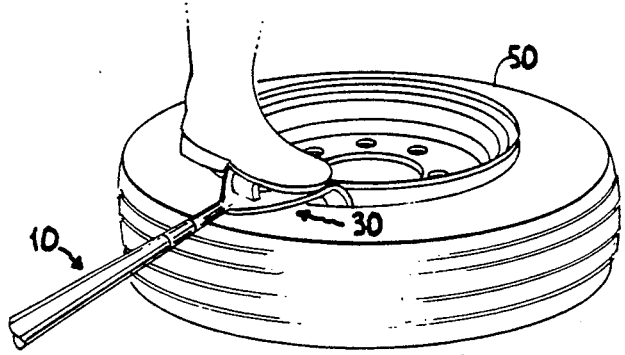
FIG. 5 is a top perspective view of the tire removal tool, shown inserted between an upper tire bead and a wheel rim flange.
Figure 5A:
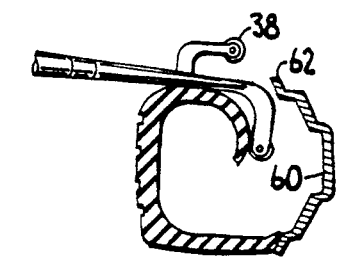
FIG. 5a is a cross-section view of the tire and tire removal tool shown in FIG. 5.

Successive steps for use of the tire removal tool according to the invention to completely remove a tire from a rim are shown in FIGS. 4-12. The tire removal tool 10, and more particularly tool head 30 thereof, is applied to the tire 50 as shown in FIG. 4. The tire is preferably disposed horizontally on a floor. The tire is deflated such that the bead can be pushed back from the rim flange. The at least two tire contact parts 34 of the tire engaging member 32 are inserted between the upper tire bead 52 as shown in FIG. 5a, and an upper wheel rim flange 62. The user may urge the at least two tire contact parts into insertion by applying pressure to the back of the tool head 30 with his foot, as shown in FIG. 5, to part the bead from the rim flange and to open a space for the tool head.

After insertion of the at least two tire contact parts, the user applies a lifting force to the handle end 20 of the tire removal tool. This urges the wheel rim contact part 38 into contact with the wheel rim 60 from the outside as shown in FIGS. 6 and 6a, the space defined between rim contact part 38 and tire contact parts 34 allowing the rim to pass under the L-shaped rim engaging member 36, by a short distance, whereupon rim contact part 38 resides on the outside of the rim opposite the tire bead and defines a pivot means for enabling pivoting of the tool head 30 about the wheel rim contact part 38.

Figure 6:
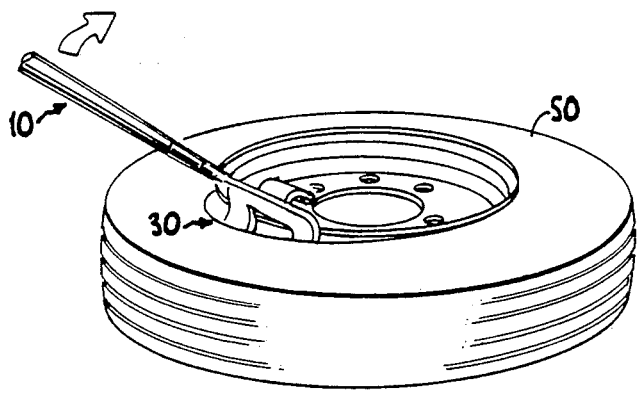
FIG. 6 is a top perspective view of the tire removal tool partially rotated for lifting the upper tire bead over the wheel rim flange.
Figure 6A:
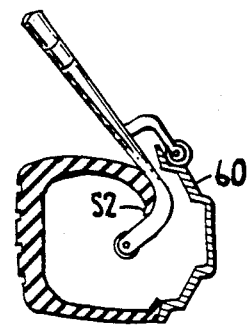
FIG. 6a is a cross-sectional view of the tire and tire removal tool shown in FIG. 6.
Figure 7:
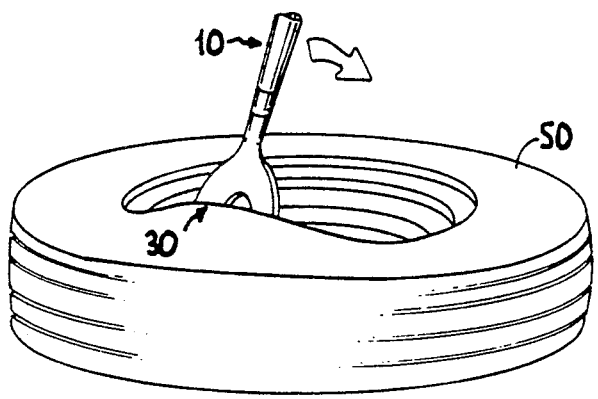
FIG. 7 is a view of the tire removal tool lifting a portion of the upper tire bead beyond the wheel rim flange.
Figure 7A:
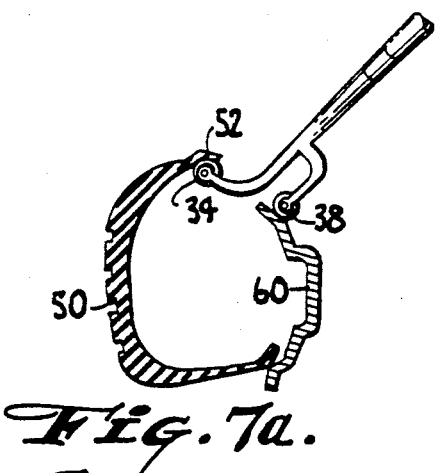
FIG. 7a is a cross-sectional view of the tire and tire removal tool shown in FIG. 7.
Figure 8:
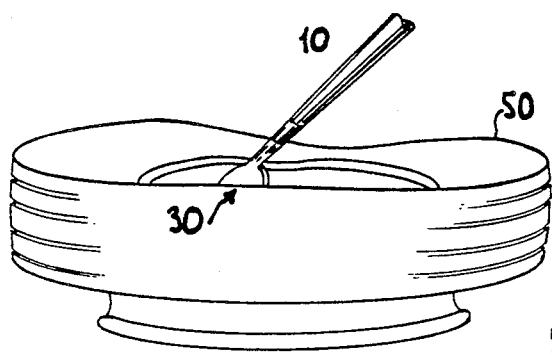
FIG. 8 is a view of the tire removal tool lifting the entire upper tire bead beyond the wheel rim flange.
Figure 8A:
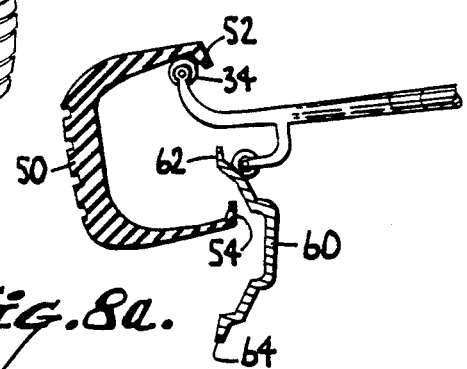
FIG. 8a is a cross-sectional view of the tire and tire removal tool shown in FIG. 8.

The user continues to apply force to the handle end 20 in the direction shown by the arrow in FIG. 6. Using the wheel rim as a fulcrum, the user rotates the tire removal tool toward the center of the tire. The at least two tire contact parts 34 are urged into engagement with the upper tire bead 52 as shown in FIGS. 7 and 7a. As the elongated body member 10 of the tire removal tool is brought toward a horizontal position, a portion of the upper tire bead 52 is lifted beyond the wheel rim flange 62 by the at least two tire contact parts 34. Further rotation of the tire removal tool causes the at least two tire contact parts 34 to urge the tire bead 52 toward the center of the tire. The contact parts 34 are spaced from one another (e.g., by at least around 8 inches for a typical truck tire). As the contact parts pull a progressively larger proportion of the bead past the rim flange, the combination of lifting the tire bead and pulling it toward the center of the tire eventually causes a greater portion of the tire bead to be lifted beyond the upper wheel rim flange 62 than remains below the wheel rim flange. Prior to maximum rotation of the tire removal tool to the point where the elongated body member contacts the tire at a point diagonally opposite from where the tire engaging member is inserted, the entire circumference of the upper tire bead is pulled beyond the wheel rim flange. Accordingly, in one quick leverlike motion involving inserting the tool head and rotating the tool handle across the tire, the entire bead is pulled over the rim flange. The resulting location of the tire with respect to the wheel rim is as shown in FIGS. 8-8a, where the upper tire bead 52 is removed from the wheel rim 60 and lower tire bead 5 remains between the upper wheel rim flange 62 and lower wheel rim flange 64, keeping the tire captive on the wheel.

Figure 9:
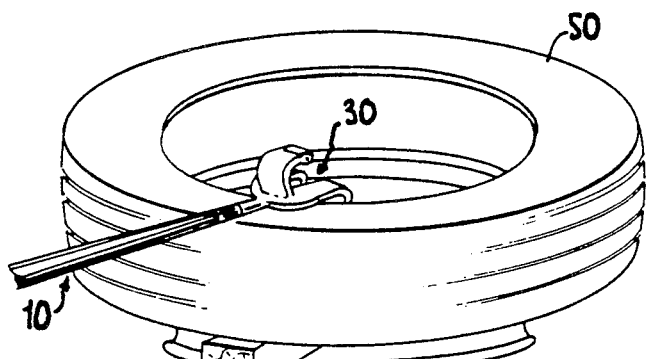
FIG. 9 is a view of the tire removal tool prior to insertion between a lower tire bead and the wheel rim.
Figure 9A:
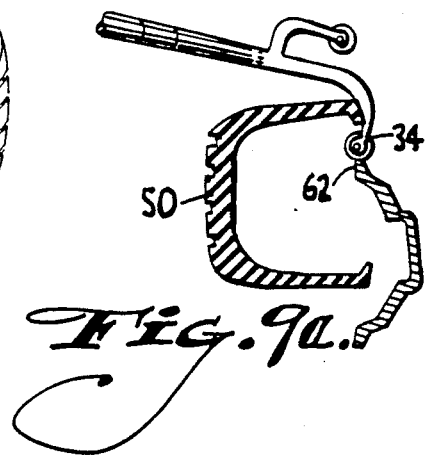
FIG. 9a is a cross-sectional view of the tire and tire removal tool shown in FIG. 9.

According to the invention the lower tire bead 54 is lifted over the upper wheel rim flange 62 in a similar manner as the upper tire bead 52. The user again inserts the tool into the space between the tire and the rim, as shown in FIG. 9. Inasmuch as the rim engaging part 38 defines an L-shape extending above the plane of the tool head while tire engaging members 32 protrude in L-shaped manner from the opposite side of the tool head, it is possible to reach down into the tire to engage members 32 around the lower bead 50. For this purpose the tool is positioned as shown in FIG. 10, with the edge of the wheel rim flange placed upwardly toward the L-shaped connection of rim contact part 38 on the tool head plane. The tire engaging members 34 are thus displaced downwardly to nearly the level of the lower tire rim flange, and can readily engage the lower bead. Although it is not strictly necessary, it is helpful and quicker at this time to support a portion of the tire above the surface of the ground, for example with a block of wood 66 or on the toe of the user's boot, or the like, as shown in FIGS. 9-12.

In order to remove the lower tire bead 54, the user inserts the tire engaging member between the tire 50 and the wheel rim 60 as shown in FIG. 10a, and engages the upper wheel rim flange 62 between the wheel rim engaging member 36 and the tire engaging member 32. The at least two tire contact parts 34 are brought underneath the lower tire bead 54 as shown in FIG. 11a. By again rotating the elongated body member diagonally across the tire, the lower tire bead 54 is lifted beyond the upper rim flange 62 and can be pulled entirely free via a single lever motion. The tire is removed from the wheel rim as shown in FIGS. 12-12a.

The spacing between the contact parts 34 38 or the like due to the opposite L-shaped connections of the engaging members 32, 36 to the tool head thus assists by increasing the space between the first means (contact part 38) and the point of tire contact (contact parts 34), while providing a structure allowing contact parts 34 to be moved well down toward the lower rim flange.

I claim:

1. A tool for removing a tire from a wheel rim, the wheel rim having axially spaced flanges at a radially outward edge, the tire having axially spaced beads at a radially inward edge, the beads disposed prior to removal between the flanges of the wheel rim, the beads having a circumference smaller than a circumference of the wheel rim, the tool comprising:
   an elongated body member defining a handle end and a tool end;
   a tool head at the tool end of the elongated body member, the tool head having:
      a tire engaging member extending from the elongated body member and terminating in laterally spaced apart tire contact parts dimensioned for insertion between one of the flanges and one of the beads; and
   a rigid, L-shaped wheel rim engaging member extending from the tire engaging member and terminating in a wheel rim contact part, said wheel rim contact part being sufficiently spaced from the tire engaging member to accept a wheel rim flange therebetween, said wheel rim contact part, when disposed on the wheel rim, defining a pivot means for enabling pivoting of the tool head about the wheel rim contact part.

2. The tool according to claim 1, wherein the tire engaging member defines at least two laterally spaced apart legs.

3. The tool according to claim 2, wherein the at least two legs diverge as they extend from the elongated body member.

4. The tool according to claim 1, wherein the wheel rim contact part comprises at least one rotatable roller.

5. The tool according to claim 1, wherein at least one of the at least two tire contact parts comprises at least one rotatable 6. The tool according to claim 1, wherein each of the wheel rim contact part and the at least two tire contact parts comprises at least one rotatable roller.

7. The tool according to claim 1, wherein the tire engaging member is L-shaped.

8. The tool according to claim 1, wherein the at least two tire contact parts are disposed substantially along an arc of a tire bead when the wheel rim flange is between the wheel rim contact part and the tire engaging member.

9. A tool for removing a tire from a wheel rim, the wheel rim having axially spaced flanges at a radially outward edge, the tire having axially spaced beads at a radially inward edge, the beads disposed prior to removal between the flanges of the wheel rim, the beads having a circumference smaller than a circumference of the wheel rim, the tool comprising:

an elongated body member defining a handle end and a tool end;

a tool head at the tool end of the elongated body member, the tool head having:

a tire engaging member extending from the elongated body member and terminating in laterally spaced apart tire contact parts dimensioned for insertion between one of the flanges and one of the beads, and wherein each of the tire contact parts comprises at least one rotatable roller;

a rigid L-shaped wheel rim engaging member extending from the tire engaging member and terminating in a wheel rim contact part, wherein the wheel rim contact part comprises at least one rotatable roller which is sufficiently spaced from the tire engaging member to accept a wheel rim flange therebetween, said wheel rim contact part, when disposed on the wheel rim, defining a pivot means for enabling pivoting of the tool head about the wheel rim contact part.

10. The tool according to claim 9, wherein each of the at least one rotatable rollers are cylindrical.

11. The tool according to claim 9, wherein each of the at least one rotatable rollers are conical.

12. The tool according to claim 9, wherein each of the at least one rotatable rollers are spherical.

13. The tool according to claim 9, wherein each of the at least one rotatable rollers has a rotation axis, and the rotation axes are not parallel.

14. The tool according to claim 9, wherein the tire engaging member defines at least two laterally spaced apart legs.

15. The tool according to claim 14, wherein the at least two legs diverge as they extend from the elongated body member.

16. The tool according to claim 9, wherein the tire engaging member is L-shaped.

17. A tool for removing a tire from a wheel rim, the wheel rim having axially spaced flanges at a radially outward edge, the tire having axially spaced beads at a radially inward edge, the beads disposed prior to removal between the flanges of the wheel rim, the beads having a circumference smaller than a circumference of the wheel rim, the tool comprising:

a tool head defining a plane and having a tire engaging member terminating in a bend such that a distal end of the tire engaging member defines laterally spaced tire contact parts disposed at a distance from the plane, the tire engaging member being dimensioned for insertion between one of the flanges and one of the beads;

a rim engaging member disposed on the tool head and having a substantially L-shaped form, the rim engaging member protruding from the plane at a right angle and extending through a right angled bend to a rim contact part, the rim contact part being spaced from the plane a distance at lest as large as a thickness of the wheel rim, said rim contact part, when disposed on the wheel rim, defining a pivot means for enabling pivoting of the tool head about the wheel rim contact part; and means for allowing a suer to exert a force on the tool head when the tire engaging member is inserted and the rim contact part is disposed on the outside of the rim, for rotating the tool head around the contact part.

18. The tool according to claim 17, wherein the means for allowing a user to exert a force is an elongated handle.

19. The tool according to claim 17, wherein the tool head has two laterally spaced legs defining said plane.

20. The tool according to claim 17, wherein the distal end of at least one of the rim engaging member and the tire engaging member has a roller.

* * * * *

UNITED STATES PATENT AND TRADEMARK OFFICE
CERTIFICATE OF CORRECTION

PATENT NO. : 5,123,470
DATED : June 23, 1992
INVENTOR(S) : Loi V. Tran

It is certified that error appears in the above-identified patent and that said Letters Patent is hereby corrected as shown below:

Col. 7, claim 5, line 3, after the word "rotatable", insert the following --roller.--

Col. 8, claim 17, line 20, delete the word "lest" and insert --least--.

Col. 8, claim 17, line 25, delete "suer" and insert --user--.

Col. 5, line 64, delete the number "5" and insert --54--.

Col. 6, line 35, delete "first" and insert --pivot--.

Signed and Sealed this

Twenty-fourth Day of August, 1993

Attest:

BRUCE LEHMAN

Attesting Officer

Commissioner of Patents and Trademarks